Figure 2:
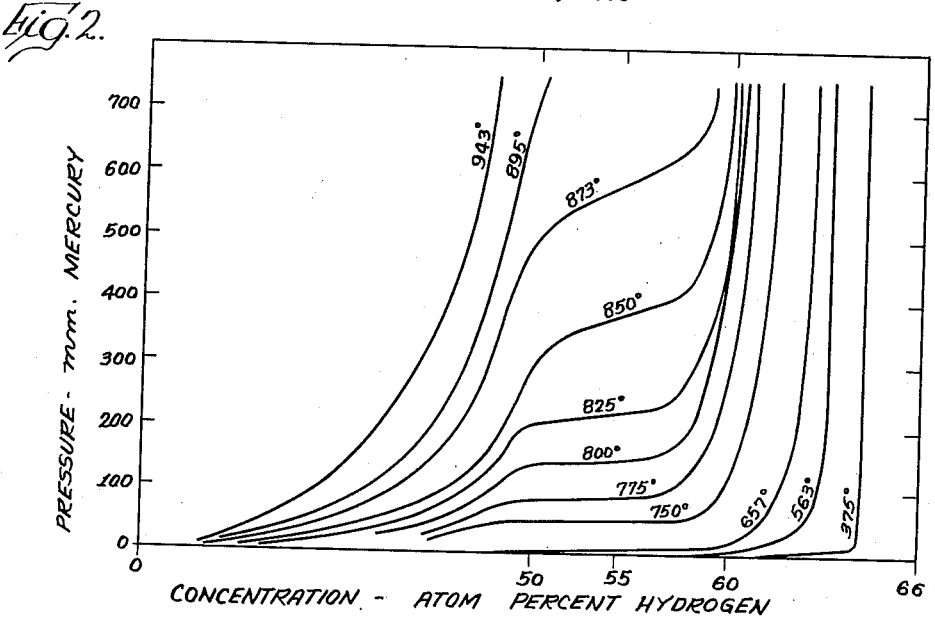

Dec. 25, 1962

U. MERTEN 3,070,526

PRODUCTION OF ZIRCONIUM HYDRIDE

Filed Jan. 29, 1958

INVENTOR.
Ulrich Merten
BY
Soons, Anderson, Luedeka & Fitch
Attys.

United States Patent Office 3,070,526
Patented Dec. 25, 1962

3,070,526
PRODUCTION OF ZIRCONIUM HYDRIDE
Ulrich Merten, Solana Beach, Calif., assignor to General Dynamics Corporation, New York, N.Y., a corporation of Delaware
Filed Jan. 29, 1958, Ser. No. 711,975
8 Claims. (Cl. 204—154.2)

The present invention generally relates to the hydriding of zirconium and more particularly relates to a method of uniformly hydriding solid pieces of zirconium and zirconium alloys of substantial size without substantial cracking thereof.

Hydrides of zirconium and zirconium alloys are becoming important for various applications, particularly in the field of reactor engineering, e.g. some types of nuclear fuel elements. Conventional methods of preparing such hydrides generally yield the hydrides in the form of small irregularly shaped pieces or powders. In this connection, zirconium and zirconium alloys when hydrided under conventional hydriding conditions are usually subjected to considerable stresses and strains. When the zirconium metal or alloy is initially present in pieces of substantial size, cracks and fissures usually occur therein during hydriding, and as the hydriding proceeds the pieces tend to break down into small sizes. The small pieces of the hydrides which are usually obtained are ordinarily not utilizable without further processing.

Accordingly, it is common practice to hydride zirconium and zirconium alloys in the form of fine particles or powder rather than attempting to hydride larger pieces of the metal and alloy, and it is possible to thereafter process the resultant hydride particles or powder to a more readily utilizable form, that is, larger solid size, as by forming or shaping operations. The processing steps necessary to fabricate these hydride pieces of small size and powder into finished utilizable form are relatively complicated and time consuming, due to the physical characteristics of the hydrides. In addition, when carrying out conventional forming and shaping operations on the hydride, the hydrogen in the hydride has a pronounced tendency to dissociate from the zirconium or zirconium alloy.

The foregoing difficulties in connection with the preparation of zirconium hydrides and hydrides of zirconium alloys in utilizable solid form of substantial size have been overcome by the method of the present invention.

This method allows pieces of zirconium and zirconium alloys to be fabricated to the approximate size and shape desired for the finished zirconium hydride or hydride of zirconium alloy, and then be hydrided in a manner which prevents cracking and distorting of the pieces in any way, except for a predictable expansion in size due to the addition of the hydrogen to the zirconium during the hydriding process. Where a zirconium alloy is utilized, the hydriding conditions of this method are such that the hydriding is essentially that of the zirconium in the alloy.

Fully fabricated hydrides of zirconium or zirconium alloy of any desired shape and size, within fairly small tolerances, can be produced by the method of the present invention Moreover, such hydride pieces have a uniform distribution of hydrogen therethrough and the hydrogen to zirconium ratio thereof can be carefully controlled, and may be relatively high, up to about 1.9 or more. By utilizing the method of the present invention, any desired forming operations can be performed or the relatively easily fabricable zirconium metal or zirconium alloy and the necessity of carrying out such operations on the difficultly fabricable hydrides is obviated Moreover, the method of the present invention is relatively simple and inexpensive, and can be carried out with relatively simple equipment to yield high quality solid pieces of zirconium hydrides.

Figure 1:
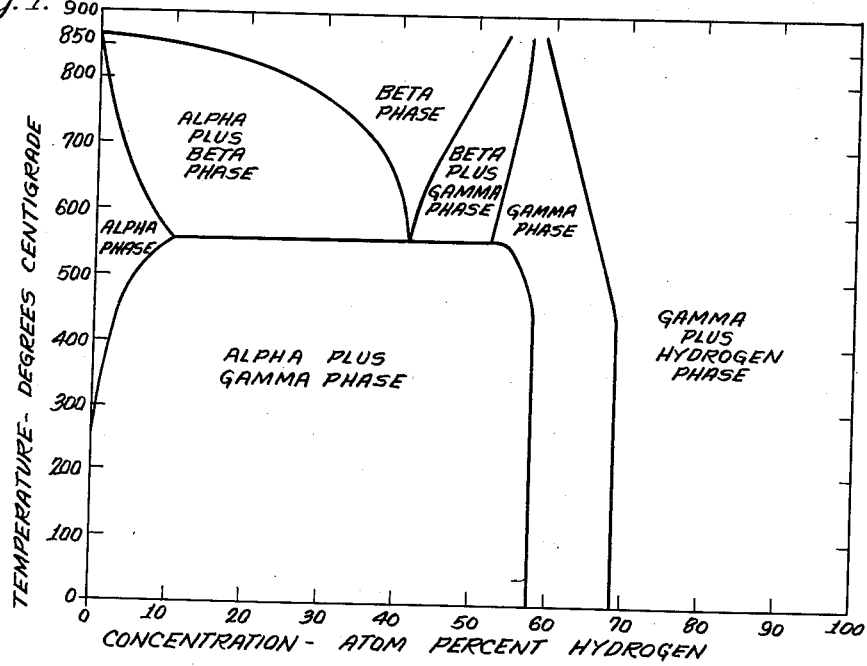

Accordingly, it is the principal object of the present invention to provide a method for preparing hydrides of zirconium and zirconium alloys in solid form, of any desired size and shape. It is also an object of the present invention to provide a simple inexpensive method of hydriding to a controlled degree, solid pieces of zirconium and zirconium alloys of any desired size without producing cracks, voids or other distortions therein. It is a further object of the present invention to provide a method of preparing fully fabricated zirconium hydrides and hydrides of zirconium alloy without forming or shaping the hydrides. Further objects and advantages of the present invention will be apparent from a study of the following detailed description and of the accompanying drawings, in which:

FIGURE 1 is a zirconium-hydrogen phase diagram, substantially as per D. A. Vaughn and J. R. Bridge, Journal of Metals, vol. 8, page 528, 1956, with the hydrogen concentration in zirconium plotted against temperature; and, FIGURE 2 is a graph substantially as per Hall, Martin and Rees, Transactions of the Faraday Society, vol. 41, page 306, 1945, depicting various zirconium-hydrogen absorption isotherms, with the hydrogen concentration in zirconium plotted against pressure, for a number of different temperatures.

The method of the present invention essentially comprises hydriding solid pieces of zirconium metal or zirconium alloy under controlled temperature and pressure conditions in a controlled atmosphere to produce the hydride thereof in solid form. The pressure of the hydriding system is carefully controlled during hydriding so as not to substantially exceed the equilibrium or dissociation pressure of a selected phase of the solid zirconium-hydrogen solution at the selected hydriding temperature, as more fully described hereinafter.

Hydriding may be carried out, in accordance with the method of the present invention, either on zirconium metal or on a suitable alloy of zirconium, for example, a zirconium-uranium alloy, wherein the alloying metal is present in a minor amount. An example is zirconium-uranium alloy containing 8 percent by weight of uranium. Other suitable zirconium alloys may also be hydrided in accordance with the method of the present invention.

The zirconium or zirconium alloy may be in any desired form, as in a fully fabricated form, such as a finished rod, plate or the like, and of any desired size. Rods of 1.5 inches or more in diameter can be successfully hydrided, as well as smaller size rods and the like. The piece of zirconium or zirconium alloy to be hydrided should be solid and without cracks, fissures or voids. Preferably, it should not have an unusually large grain size or other atypical physical characteristics, such as are found in some "as-cast" materials. In general, the degree of hydrogen absorption obtainable with satisfactory results will decrease with increasing content of the alloying metal in the zirconium alloy. The size and shape of the metal or alloy piece affect the rate of hydriding and the concentration of hydrogen which can be readily added. However, if hydriding is carefully carried out over a sufficiently long period of time, it is believed zirconium metal pieces of any reasonable size can be successfully hydrided to atom ratios of hydrogen to zirconium of up to 1.9 or more.

The volume expansion of zirconium and zirconium alloys during hydriding can be calculated from the known densities of various forms of zirconium metal, various alloys thereof and the hydrides thereof. However, in calculating the size and shape to which the zirconium metal or alloy is to be fabricated in order to provide a piece of hydride of the desired size and shape, the linear expansion of the metal or alloy during hydriding must be taken into account. Such linear expansion may be anisotropic and, in general, is a function of the previous history of the piece. Various forming operations, such as drawing, rolling and the like, to which the metal or alloy has been subjected, tend to affect the degree of linear expansion which occurs during hydriding of the metal or alloy. One generally desires the solid zirconium hydride to be of accurate final dimensions without requiring machining operations after the hydriding procedure because of the brittle character of the zirconium hydride. If accurate final dimensions are required in producing a hydride of zirconium or zirconium alloy of a certain size and shape, the necessary allowance for expansion during hydriding is preferably predetermined experimentally on similarly worked pieces of the zirconium metal or alloy.

It is possible, therefore, to work and shape zirconium metal or alloy pieces so that the hydride thereof obtained by practicing the method of the present invention is in the desired size and shape, within fairly small tolerances, and necessitates no separate working or shaping after the hydriding. This is an important advantage, not only because of the difficulty in working the zirconium hydride but also because of the hydrogen loss which normally occurs during working and shaping of the hydride at elevated temperatures. All forming procedures are applied to the zirconium metal and alloys, which can be worked and shaped by conventional procedures, and the hydride is obtained in a solid, fully finished form by a procedure which results in a considerable reduction in cost and time.

Although the present invention is particularly directed to the production of solid pieces of zirconium hydrides of controlled shape and size, it is obvious that working and shaping operations need not be carried out on the zirconium metal or alloy, if it is not desired to obtain the hydride in a particular size and shape. In such event, any solid piece of zirconium metal or alloy can be utilized in the method of the present invention. The resultant hydride will be solid and have a uniform concentration of hydrogen therein when hydrided in accordance with the method of the present invention.

When hydriding is carried out, the surface of the zirconium metal or alloy should be as free as possible from those contaminants which hamper the diffusion of hydrogen into the zirconium. Such contaminants are usually compounds of non-metals with zirconium, for example, zirconium oxide. Accordingly, it is preferred to clean the surface of the metal or alloy with a suitable cleaning agent. A preferred cleaning agent is an aqueous solution of a mixture of nitric and hydrofluoric acids, which substantially removes contaminants which interfere with the diffusion of hydrogen into the zirconium. After the surface is cleaned, it may be washed with distilled water until free of the acid mixture or other cleaning agent. The cleaned surface may then be dried and is ready to be hydrided.

In carrying out the hydriding procedure, the zirconium metal or alloy is first placed within a controlled atmosphere. By controlled atmosphere is meant a relatively high vacuum, such as a pressure of not more than about 1 micron of mercury, or an atmosphere which consists essentially of hydrogen and/or one or more inert gases, that is, gases which are not absorbed by and which do not react with the zirconium metal or alloy, even at temperatures to which the hydriding system is to be subjected, that is, as high as 900° C. or more. Vacuum is generally preferred.

The controlled atmosphere is as free as practicable from undesired compounds which would deleteriously react with the zirconium or which would be absorbed by it before and/or during hydriding. In this connection, it is desired to eliminate as far as possible the formation of compounds which would interfere with the diffusion of hydrogen into the zirconium or which would otherwise impede the hydriding.

In the event that hydrogen is utilized as the controlled atmosphere, or in a mixture with one or more of the inert gases it is preferred to utilize as pure hydrogen as possible. Accordingly, commercially pure hydrogen may be further purified before use in the apparatus, by passing it over activated charcoal at a low temperature, such as about −195° C. Such purified hydrogen contains little hydriding rate-reducing contaminants, and is also subsequently utilized for establishing and maintaining the hydrogen pressure during hydriding.

A suitable apparatus capable of holding the zirconium metal or alloy piece and of establishing and maintaining the controlled atmosphere and hydriding conditions may be, for example, a conventional mullite furnace tube, which is preferably only slightly larger in size than the metal or alloy piece. Whatever hydriding apparatus is utilized, it should be sealable from the atmosphere and should include means for heating the metal or alloy and for controlling the rate of introduction of hydrogen into the system. A pumping system may be included, as well as electric heating coils and a thermocouple and/or other means for measuring and controlling the temperature in the system. In addition it may be desirable to provide for measuring the pressure of the system, such as a pressure gauge.

After the zirconium metal or alloy is placed within the hydriding apparatus and the desired controlled atmosphere has been provided in a conventional manner, i.e., as by flushing with hydrogen and/or inert gas, or by evacuating the apparatus to a low pressure, as indicated, the temperature of the zirconium metal or alloy is increased to a selected hydriding temperature as by the heating unit of the apparatus. The hydrogen pressure within the apparatus is also adjusted to a pre-selected value, purified hydrogen being brought into contact with the heated zirconium metal or alloy, so that hydriding begins. The hydriding rate is carefully controlled, by adjustment of the hydriding temperatures and pressures, in accordance with the following criteria.

In order to assure a substantially uniform hydrogen distribution throughout the metal or alloy and to prevent cracking of the metal or alloy during hydriding, it has been found that the main hydriding, and preferably substantially all hydriding, should be carried out under controlled temperature conditions. It is not generally desirable to form appreciable quantities of zirconium hydride at low temperatures, for example, below about 500° C., since below this temperature the diffusion in the zirconium is slow, resulting in a high hydrogen gradient in the zirconium. This creates a large surface expansion which has a tendency to cause cracking of the solid. Accordingly, it is undesirable to only gradually raise the temperature of the metal or alloy in the case where hydrogen is initially present in considerable amounts in the controlled atmosphere in the hydriding apparatus, that is, before the desired hydriding temperature is reached, since some hydriding will then occur at relatively low temperatures. Instead, the metal or alloy should, in this case, be rapidly raised in temperature to the desired hydriding temperature.

The hydriding of zirconium and zirconium alloys is an exothermic reaction. Accordingly, after the hydriding temperature in the apparatus is reached, the heating unit of the apparatus may be reduced in output or shut off so as to maintain the desired temperature conditions with the aid of the heat evolved from the exothermic reaction. In this connection, the initial hydriding rate must be carefully controlled so that there is no large temperature surge. Accordingly, the rate of hydrogen flow into the apparatus is metered. Preferably, hydrogen is initially slowly introduced to the system and initial localized heating of the surface of the zirconium piece is prevented. Thereafter, the hydrogen flow rate can be increased while still maintaining the desired temperature conditions, to build up to the desired operating pressure.

Reference is now made to FIGURE 1 of the accompanying drawings, which figure depicts a zirconium-hydrogen phase diagram, hydrogen concentration in zirconium being plotted against various hydriding temperatures. It will be seen from FIGURE 1, that zirconium during hydriding passes through a number of distinct phases, depending on the particular hydriding temperature. Zirconium at a temperature below 863° C. is initially present as a solid solution in the alpha phase when hydrided, which phase is an allotropic form characterized by hexagonal close packed crystals. Zirconium, when increased to a temperature above 863° C. and below its melting point of 1845° C. during hydriding, is initially present as a solid solution in the beta phase, a body-centered cubic allotropic form. The gamma zirconium hydride encountered during hydriding has been found to be highly brittle and have a pronounced tendency to crack. When hydriding of zirconium takes place at temperatures below 560° C., the system passes from the alpha region directly into a two phase region, that is, the alpha plus gamma field. This phase comprises a mechanical mixture of alpha zirconium as a solid solution and gamma zirconium hydride. During hydriding of zirconium, at temperatures above 560° C. and below 863° C., the system passes from the alpha region directly into the alpha plus beta two-phase region. It is, of course, desirable to carry out the hydriding under conditions which will minimize the danger of cracking of the metal or alloy. Accordingly, it has been found preferable to carry out as much of the hydriding as possible at temperatures above those where the brittle gamma phase readily forms at low hydrogen concentrations. For this reason, hydriding temperatures above about 560° C. are utilized in the method of the present invention.

In addition, it has been found that the rate of diffusion of hydrogen into zirconium or zirconium alloy increases with temperature, although the maximum concentration of hydrogen which can be obtained in the metal or alloy at a given pressure decreases as the hydriding temperature rises. Such latter effect can be readily seen in FIGURE 2 of the accompanying drawings, which sets forth a family of curves representing zirconium-hydrogen absorption isotherms, the equilibrium concentration of hydrogen in zirconium having been plotted against hydrogen pressure for a number of operating temperatures. Referring to FIGURE 2, it is seen that for a given hydrogen pressure, for example, 300 mm. mercury, the equilibrium hydrogen concentration increases as the operating temperature decreases. However, at operating temperatures above about 560° C. relatively high concentrations of hydrogen in zirconium are still possible at reasonable hydrogen pressures.

It has been found that operating (hydriding) temperatures below about 700° C. are commercially impractical, not only from the previously-mentioned aspect of encountering gamma phase zirconium hydride and its attendant difficulties at low hydrogen concentrations (at temperatures below 560° C.), but also because of the extremely low hydriding rates afforded at such low hydriding temperatures. Accordingly, for most purposes hydriding temperatures above about 700° C. are utilized.

Again referring to FIGURE 1 of the accompanying drawings, it will be seen that when hydriding of zirconium is carried out at temperatures above about 560° C., alpha zirconium is rapidly converted to beta zirconium. Beta zirconium has the ability to absorb substantial quantities of hydrogen, with accompanying expansion of size, the saturation point of the beta solid solution depending upon the particular hydriding temperature. Thus, for example, at about 800° C., the saturation point of the beta solid solution is reached when the hydrogen concentration within the solid solution is about 50 atom percent. As the hydriding temperature increases, the saturation point of the beta solid solution also increases.

When the saturation point for hydrogen within the beta solid solution is reached for a given temperature, further additions of hydrogen to the system under increased hydrogen pressure result in the formation of a two phase system comprising the saturated beta zirconium and gamma zirconium hydride. This may be seen from the phase diagram of FIGURE 1.

The hydriding of zirconium can be continued under increased hydrogen pressure to the limit of the hydrogen concentration specified in the graph of FIGURE 2 for the particular operating temperature and maximum system hydrogen pressure. Thus, when the operating temperature is about 800° C. the hydrogen concentration can be increased from 50 atom percent, which is the saturation point of the beta solid solution, to a maximum hydrogen concentration of about 60 atom percent, by increasing the hydrogen pressure in the system up to about one atmosphere. This causes the zirconium hydrogen alloy to enter the gamma phase, as shown in FIGURE 1.

However, in order to minimize cracking of the zirconium metal or alloy, it has been found that the hydriding should be conducted in such a manner that substantially all of the zirconium present is hydrided to the saturation point of the beta solid solution shown in FIGURE 1 prior to any substantial additional hydriding. Since the hydrogen concentration is greatest at the surface of the alloy during hydriding, this may be accomplished by maintaining the hydrogen pressure at the surface of the alloy below the equilibrium dissociation pressure of the saturated beta solid solution at the surface temperature. The limiting pressure which is permissible at a given operating temperature may be readily determined from FIGURES 1 and 2.

It is preferable that the beta zirconium should be substantially saturated with hydrogen at the operating temperature before any substantial proportion of the zirconium hydrogen alloy is allowed to go into the gamma phase. This is in view of the fact that beta zirconium is relatively ductile and does not have a tendency to readily crack. However, gamma zirconium hydride is relatively brittle and has a tendency to crack even at high operating temperatures so that hydriding of pieces, particularly pieces of substantial size, of zirconium or zirconium alloys in the gamma phase is relatively difficult. If the hydrogen pressure is allowed to become too great, the outer layers of the zirconium metal or alloy will be converted to gamma zirconium hydride while the inner portions of the metal are still expanding due to hydrogen absorption in the beta phase. Such hydrogen concentration gradients in the metal piece materially increase chances of the metal piece cracking. Hydriding temperatures within the range of from about 700° C. to about 900° C., which permit most of the total hydrogen to be absorbed only in the beta phase, are preferred. Temperatures above about 900° C. and below 1800° C. do not afford a sufficiently high maximum hydrogen concentration in zirconium at the usual operating pressures. However, their use is not to be excluded for the purposes of the present invention.

It is advantageous to conduct the hydriding at as high a hydrogen pressure as possible while still maintaining the zirconium in the beta phase during hydriding. This is because as the pressure in the system is increased, so also is the hydriding rate. The hydriding proceeds at a relatively slow rate at relatively low hydrogen pressures.

It has been found that contaminants which reduce the hydriding rate are usually present to some extent in the hydriding system, even if the zirconium metal or alloy is cleaned before hydriding and if purified hydrogen is utilized during hydriding. Accordingly, the operating pressure must be high enough to compensate for the effect of such contaminants. Usually, a system hydrogen pressure of about 100 mm. of mercury in excess of the dissociation pressure will give an effective pressure which will not cause gamma zirconium hydride precipitation. Such excess system hydrogen pressure is generally desirable in order to increase the hydriding rate to a sufficiently high level. Where the concentration of hydrogen diffusion rate-depressing contaminants is higher or lower, correspondingly higher or lower system pressures, respectively, must be utilized.

As indicated above, the dissociation pressure for a saturated beta solid solution at any given hydriding temperature within the range of up to about 900° C. can be readily determined from the accompanying drawings. For example, if it is desired to carry out hydriding at 800° C., the maximum hydrogen concentration in the beta solid solution at this temperature is about 50 atom percent. By considering the isothermic curve for 800° C. in the graph of FIGURE 2, it will be noted that in order to obtain a 50 atom percent saturation, the pressure must be about 130 mm. of mercury. However, this pressure can be exceeded by about 100 mm. of mercury in the usual situation in view of the presence of hydriding rate-depressing contaminants, and the hydriding rate will thereupon be sufficiently rapid for commercial purposes. Moreover, hydriding can be substantially confined to the beta phase and cracking of the metal or alloy can be avoided.

The length of time required to hydride the metal or alloy piece will depend on its size and shape and upon the particular temperature and pressure selected. In practice, the system is generally heated to the desired operating temperature, and the hydrogen is then admitted at a generally uniform rate which is not so rapid as to cause a substantial increase (say, greater than 50° C.) in sample temperature or to cause the system hydrogen pressure to exceed that determined by the principles outlined in the foregoing. As an example, a ½ inch diameter rod of zirconium can be hydrided to about 50 atom percent hydrogen concentration at a uniform hydrogen addition rate in about 4 hours at 800° C. without exceeding a system hydrogen pressure of about 230 mm. of mercury.

In hydriding in the beta plus gamma region or gamma phase, the pressure in the system may exceed the equilibrium pressure for the sample, that is, the dissociation pressure for the beta solid solution at the hydriding temperature or the dissociation pressure corresponding to the average composition of the sample, respectively. For a hydriding temperature of 800° C., such equilibrium pressure in the beta plus gamma region is, as previously indicated, about 130 mm. of mercury, and for 850° C. it is about 340 mm. of mercury. In view of the usual presence of reaction rate-reducing contaminants, as previously described, a hydrogen pressure should be selected which will compensate for such contaminants and which will provide or exceed the dissociation pressure. In the usual cases, hydrogen pressures of about 200 to 300 mm. of mercury in excess of the dissociation pressure are satisfactory. Indeed, it is advisable to thus exceed the dissociation pressure in order to assure hydriding in the beta plus gamma region or gamma phase at a sufficiently hgh hydriding rate, as in the case of hydriding in the beta phase.

When hydriding is to be carried out beyond the point of beta saturation, it is good practice to first bring the system to the saturation point of the beta solid solution and allow a certain period of time for equalizing of the hydrogen concentration throughout the solution. Thereafter, the hydrogen pressure is increased up to 200 to 300 mm. of mercury above the beta solid solution dissociation pressure, and hydriding in the beta plus gamma region is effected. Further hydrogen pressure increases will be required to obtain reasonable hydriding rates after the sample has been completely converted to the gamma phase. With substantially no further hydrogen absorption in the beta phase, and, consequently no attendant substantial increase occurring in the size of the zirconium, hydrogen absorption to form gamma zirconium hydride can be effected at 800–850° C. without cracking the metal piece.

Pieces of zirconium and zirconium alloy containing up to 8 percent by weight of uranium and of substantial size have been successfully hydrided in accordance with the foregoing principles at temperatures of up to about 900° C. and utilizing hyrdrogen pressures not in excess of 300 mm. of mercury above the dissociation pressures for the saturated beta solid solution. In the case of such zirconium-uranium alloys, the information set forth in FIGURES 1 and 2 for the binary zirconium-hydrogen system was adequate for determining the operating pressure and temperature. In the case of zirconium alloys containing minor amounts of another alloying metal, the desired pressure to be utilized in the hydriding process can be readily calculated from the phase diagram of the particular ternary system and from absorption isotherms for the system, in accordance with the principles set forth herein.

In practice, since the hydrogen absorption rate in the beta plus gamma and gamma regions is relatively slow, it is possible to simply maintain the system temperature and hydrogen pressure at a value arrived at by the principles outlined in the foregoing, whereupon the sample will absorb the hydrogen at a predetermined rate.

After the desired amount of hydrogen has been absorbed by the sample, the system can be allowed to cool. Cooling of the hydride should be carried out at a slow enough rate so that the effective pressure exerted by the hydrogen remaining in the hydriding chamber after cessation of the main hydriding does not, at any particular temperature for the hydride, substantially exceed the equilibrium dissociation pressure for that composition and temperature. That is, the same criteria should generally be utilized in cooling as are applied in the main hydriding step. Of course, since the hydriding chamber is sealed from further entry of hydrogen, absorption of hydrogen by the hydride during cooling results in a lowering of the hydrogen pressure exerted within the hydriding chamber. Careful cooling of the hydride assures that the additional absorption of hydrogen will occur without cracking of the hydride.

The rate of allowable decrease in temperature of the hydride within the hydriding chamber will necessarily depend upon the size and shape of the hydride piece and of the chamber, the concentration of the absorbed hydrogen and also the unabsorbed hydrogen within the hydriding chamber and other factors.

When essentially all of the remaining hydrogen has been absorbed by the hydride during slow cooling thereof, in accordance wth the principles of the present invention, the finshed hydride may then be cooled to room temperature at a more rapid rate, but one which would still not subject the hydride to thermal shock.

It is preferred to utilize a hydriding chamber which is not substantially larger than the size predicted for the hydride prepared from the zirconium metal or alloy, so that cooling of the hydride can be carried out with little further absorption of hydrogen and accordingly, the average cooling rate can be increased over that which is necessary when substantial amounts of hydrogen are present within the chamber after the main hydriding step.

The following examples further illustrate certain features of the present invention.

*Example I*

Five crack-free, fine grained plates of pure zirconium, each weighing 53.3 grams and of a size 1 inch by 10 inches by 0.1 inch, were thoroughly cleaned in an aqueous solution of a mixture of hydrofluoric acid and nitric acid in order to remove surface contaminants therefrom, including zirconium nitride. Thereafter, the plates were carefully washed with distilled water until free of the acid solution, and then dried.

The cleaned zirconium plates were stacked one above another in a U-shaped tool steel holder, corrugated molybdenum sheets of the same size as the zirconium plates being interleaved with the plates. A tool steel plate was placed on top of the stack to stabilize the stack and the assembled stack was then placed in a conventional mullite furnace tube having an inside diameter of about 1.5 inches and a length of about 24 inches. Vacuum was applied to the furnace tube so that a pressure of only about 1 micron existed in the tube. The tube was then sealed from the atmosphere and heated, while maintaining the vacuum, to a temperature of 875° C. The heating unit for the tube was then shut off and commercial grade hydrogen, which had been further purified by passing it over activated charcoal at −195° C., was then slowly bled into the mullite tube at an essentially constant rate (approximately 0.047 cubic foot a minute) over a period of about one hour and 15 minutes. The heat evolved from the reaction was sufficient to maintain the hydriding temperature at about 875° C.

It was found that since thin zirconium plates were being processed, this hydrogen addition rate did not cause the hydrogen pressure to exceed 675 mm. of mercury, that is, 100 mm. of mercury above the dissociation pressure for the beta solid solution at 875° C., until after the samples had entered the beta plus gamma field. The thinness of the plates also allowed the hydrogen concentration to become uniform sufficiently rapidly, so that no interruption in the hydriding procedure was necessary at the beta-saturation point. A total of 3.52 cubic feet (based on 760 mm. pressure and 0° C.) of the purified hydrogen was admitted to the mullite tube. Thereafter, the formed hydride was allowed to cool slowly to room temperature over a period of about six hours.

Five zirconium hydride plates, containing about 55 atom percent hydrogen substantially uniformly distributed throughout each of the plates, were obtained. The plates had retained their general shape and relative proportions during hydriding, no substantial distortion thereof having occurred. However, they were slightly increased in size due to the absorption of hydrogen. Critical examination of each of the plates revealed no appreciable flaws, cracks or voids in any of the plates.

*Example II*

A 2070 gm. zirconium alloy rod, 1.4 inches in diameter and 12 inches long, containing 8 percent by weight of uranium, was placed on a piece of molybdenum sheet of a size of about 1.5 inches by 12 inches in a conventional mullite furnace tube, having an inside diameter of about 1.75 inches and a length of about 30 inches. The tube was evacuated down to a pressure of about 1 micron and was then heated to about 800° C. and sealed. Approximately 0.042 cubic foot of commercial grade hydrogen, purified as set forth in Example I, and representing about 0.5 percent of the amount of hydrogen needed to increase the hydrogen concentration to 50 atom percent, was introduced into the tube over a period of about 10 minutes.

Additional hydrogen was then admitted to the furnace tube at a uniform rate of about 1.27 cubic feet per hour for about 5 hours. The hydrogen pressure in the tube reached a maximum pressure of about 230 mm. of mercury, that is, about 100 mm. of mercury over the dissociation pressure of the beta solid solution at 800° C. A temperature of about 800° C. was maintained in the tube during the 5 hour period.

At the end of the 5 hour period the hydriding reaction was complete. However, in order to assure uniform hydrogen distribution throughout the rod, the rod was maintained at the hydriding temperature for an additional 45 minutes. Thereafter, the system was allowed to gradually cool over a period of twelve hours to room temperature.

The hydrided rod was then removed from the furnace tube and examined. It was found that the rod had retained its original shape, but was of slightly larger size than before hydriding. Sections were taken of the rod and critically examined for hydrogen concentration and distribution and for cracks, flaws and voids. It was found that the rod had a hydrogen to zirconium ratio of 1:0 and that the hydrogen was uniformly distributed throughout the rod. Moreover, no significant flaws, cracks or voids were found in the rod, that is, the rod was substantially completely solid.

The above examples clearly illustrate that zirconium and zirconium alloys in the form of pieces of any desired size and shape can be efficiently and uniformly hydrided to a desired hydrogen to zirconium ratio, and in a manner such that the hydrides are free of cracks, flaws and voids and are substantially unchanged in form except for a slight increase in size. Accordingly, the hydrides may be prepared ready for immediate use without conventional fabrication operations.

The method of the present invention effects a significant reduction in the number and types of steps necessary to prepare such finished pieces of zirconium hydride, and hydrides of zirconium alloys, and also in the cost and time necessary for so preparing the hydrides. Further objects and advantages of the present invention are set forth in the foregoing.

Such modifications in the steps of the method of the present invention and in materials and equipment for carrying out the present method as are within the skill of those versed in the art are contemplated as being within the scope of the present invention.

I claim:

1. A method of hydriding solid metal containing zirconium which comprises the steps of raising the temperature of said solid metal disposed within a controlled environment, wherein deleterious reaction of said metal therewith is avoided, to a temperature of at least about 700° C. and below the melting point of said solid metal, said solid metal containing at least 50 percent by weight of zirconium, hydriding said zirconium by maintaining said temperature while increasing the hydrogen concentration of said controlled environment to and maintaining said concentration at a hydrogen pressure which at said temperature produces a hydriding rate not in excess of that produced by the dissociation pressure for the beta solid solution of zirconium in a contaminant-free system at said temperature, and thereafter cooling the formed hydride, whereby zirconium hydride in solid form and substantially completely free of cracks and voids is obtained, which hydride has a uniform distribution of combined hydrogen therein.

2. A method of hydriding solid metal containing zirconium which comprises the steps of raising the temperature of said solid metal disposed within a controlled environment, wherein deleterious reaction of said metal therewith is avoided, to a temperature of at least about 700° C. and not more than about 900° C., said solid metal containing at least 50 percent by weight of zirconium, hydriding said zirconium by maintaining said temperature while increasing the hydrogen concentration of said controlled environment with purified hydrogen to provide a hydrogen pressure which at said temperature produces a hydriding rate not in excess of that produced by the dissociation pressure of the beta solid solution of zirconium in a contaminant-free system at said temperature, and thereafter cooling the formed hydride, whereby zirconium hydride in solid form substantially completely free of cracks and voids is obtained, which hydride has a uniform distribution of combined hydrogen therein.

3. A method of hydriding solid metal containing zirconium which comprises the steps of raising the temperature of said solid metal disposed within a controlled environment, wherein deleterious reaction of said metal therewith is avoided, to a temperature of at least about 700° C., and not more than about 900° C., said solid metal containing at least 50 percent by weight of zirconium, hydriding said zirconium by maintaining said temperature while increasing the hydrogen concentration of said controlled environment with purified hydrogen to a level sufficient to provide a hydrogen pressure which at said temperature produces a hydriding rate not in excess of that produced by the dissociation pressure of the beta solid solution of zirconium, at said hydriding temperature in a contaminant-free system, and thereafter slowly cooling the formed hydride to room temperature while maintaining the hydrogen pressure of said controlled environment not in excess of that which produces the hydriding rate produced by said dissociation pressure for temperatures throughout the cooling range, whereby zirconium hydride in solid form substantially completely free of cracks and voids is obtained, which hydride has a uniform distribution of combined hydrogen therein.

4. A method of hydriding solid metal containing zirconium which comprises the steps of cleaning the surface of said solid metal containing at least 50 percent by weight of zirconium so as to substantially remove hydrogen diffusion rate-depressing contaminants therefrom, disposing the cleaned metal within a controlled environment, wherein deleterious reaction of said metal therewith is avoided, raising the temperature of said solid metal within said controlled environment to a hydriding temperature of at least about 700° C. and not more than about 900° C., hydriding said zirconium by maintaining said temperature while increasing the hydrogen concentration of said controlled environment with purified hydrogen to a level sufficient to provide a hydrogen pressure which at said temperature produces a hydriding rate substantially equal to but not in excess of that produced by the dissociation pressure of the beta solid solution of zirconium at said hydriding temperature in a contaminant-free system, and thereafter slowly cooling said hydride to room temperature while maintaining the hydrogen pressure of said controlled environment not in excess of that which produces the hydriding rate produced by said dissociation pressure for temperatures throughout the cooling range, whereby zirconium hydride in solid form substantially completely free of cracks and voids is obtained, which hydride has a uniform distribution of combined hydrogen therein.

5. A method of hydriding solid metal pieces of substantial size containing zirconium which comprises the steps of cleaning the surface of said solid metal containing at least 50 percent by weight zirconium so as to substantially remove hydrogen diffusion rate-depressing contaminants therefrom, said solid metal being in pieces of substantial size, disposing the cleaned metal within a controlled environment, wherein deleterious reaction of said metal therewith is avoided, raising the temperature of said metal within said controlled environment to a hydriding temperature of at least about 800° C. and not more than about 850° C., hydriding said zirconium by maintaining said temperature while increasing the hydrogen concentration of said controlled environment with purified hydrogen so as to provide and maintain a hydrogen pressure of not more than about 300 mm. of mercury in excess of the dissociation pressure of the beta solid solution of zirconium at said hydriding temperature in a contaminant-free system, and thereafter slowly cooling said hydride to room temperature while maintaining the hydrogen pressure of said controlled environment not in excess of that which produces the hydriding rate produced by said dissociation pressure for temperatures throughout the cooling range, whereby zirconium hydride in solid form substantially completely free of cracks and voids is obtained, which hydride has a uniform distribution of combined hydrogen therein.

6. A method of hydriding solid pieces of zirconium-uranium alloy of a predetermined size and shape which comprises the steps of cleaning the surface of said solid pieces of zirconium-uranium alloy of a predetermined size and shape, said uranium being present in an amount of up to about 8 percent by weight of said zirconium, to remove hydrogen diffusion rate-depressing contaminants therefrom, disposing said cleaned alloy pieces within a gas-tight region and reducing the pressure therein to about 1 micron of mercury, raising the temperature of said pieces in said region to a hydriding temperature of about 800° C., slowly introducing purified hydrogen into said region to provide a hydrogen pressure of about 100 mm. of mercury over the dissociation pressure for the beta solid solution of zirconium at said temperature, and hydriding said zirconium while maintaining said temperature substantially constant and approximately said pressure until said zirconium is substantially uniformly hydrided to a hydrogen to zirconium ratio of about 1:1, and thereafter slowly cooling said hydride to room temperature while maintaining the hydrogen pressure in said region not more than 100 mm. of mercury in excess of said dissociation pressure for temperatures throughout the cooling range, whereby zirconium hydride in solid form substantially completely free of cracks and voids is obtained in the alloy, which hydride has a uniform distribution of combined hydrogen therein.

7. A method of hydriding solid metal pieces of substantial size containing zirconium which comprises the steps of cleaning the surface of said solid metal containing at least 50 percent by weight zirconium so as to substantially remove hydrogen diffusion rate-depressing contaminants therefrom, said metal being in pieces of substantial size, disposing the cleaned metal pieces within a controlled environment, wherein deleterious reaction of said metal therewith is avoided, raising the temperature of said metal pieces within said controlled environment to a hydriding temperature of at least about 800° C. and not more than about 850° C., hydriding said zirconium by maintaining said temperature while regulating the hydrogen concentration of said controlled environment with purified hydrogen so as to provide a hydrogen pressure of not more than about 100 mm. of mercury in excess of the dissociation pressure for the beta solid solution of zirconium at said hydriding temperature until the beta solid solution phase is saturated, further increasing the amount of hydrogen in the system to provide a hydrogen pressure between about 200 mm. and about 300 mm. of mercury in excess of said dissociation pressure while maintaining said hydriding temperature in a contaminant-free system, and thereafter cooling said hydride to room temperature while maintaining the hydrogen pressure of said controlled environment not more than 100 mm. of mercury in excess of said dissociation pressure for temperatures throughout the cooling range, whereby zirconium hydride in solid form substantially completely free of cracks and voids is obtained, which hydride has a uniform distribution of combined hydrogen therein.

8. A method of hydriding solid zirconium pieces of substantial size which comprises the steps of cleaning the surface of said solid pieces of zirconium of a predetermined size and shape to remove hydrogen diffusion rate-depressing contaminants therefrom, disposing said cleaned metal pieces within a gas-tight region and reducing the pressure therein to about 1 micron of mercury, raising the temperature of said pieces in said region to a hydriding temperature of about 850° C., slowly introducing purified hydrogen into said region to provide a hydrogen pressure of about 100 mm. of mercury over the dissociation pressure for the beta solid solution of zirconium at said hydriding temperature, and hydriding said zirconium while maintaining said temperature until the beta solid solution phase is saturated, further increasing the amount of hydrogen in the system to provide a hydrogen pressure of between about 200 mm. and about 300 mm. of mercury over said dissociation pressure at said temperature while maintaining said hydriding temperature until said zirconium is substantially uniformly hydrided to a hydrogen to zirconium ratio of about 1.5:1, and thereafter slowly cooling said hydride within said region to room temperature while maintaining the hydrogen pressure within said region not more than 100 mm. of mercury in excess of said dissociation pressure for temperatures throughout the cooling range, whereby solid zirconium hydride substantially completely free of cracks and voids is obtained, which hydride has a uniform distribution of combined hydrogen therein.

References Cited in the file of this patent

UNITED STATES PATENTS 1,816,830    Driggs _____ Aug. 4, 1931

OTHER REFERENCES

"Heat Resistance of Zirconium in Several Mediums" by E. T. Hayes et al. Journal of the Electrochemical Society, vol. 97, No. 10, 1950, pp. 316–323.

Kirk-Othmer: Encyclopedia of Chemical Technology, volume 15, The Interscience Encyclopedia, Inc., New York, 1956, pp. 299–302.

UNITED STATES PATENT OFFICE

CERTIFICATE OF CORRECTION

Patent No. 3,070,526                          December 25, 1962

Ulrich Merten

It is hereby certified that error appears in the above numbered patent requiring correction and that the said Letters Patent should read as corrected below.

Column 1, line 66, for "or" read -- on --; column 11, line 13, after "zirconium" strike out the comma; column 12, line 52, after "pressure" insert -- at said temperature --.

Signed and sealed this 27th day of August 1963.

(SEAL)
Attest:

ERNEST W. SWIDER
Attesting Officer

DAVID L. LADD
Commissioner of Patents